(12) United States Patent
Smaglinski et al.

(10) Patent No.: US 11,199,679 B2
(45) Date of Patent: Dec. 14, 2021

(54) ELASTIC MOUNTING BRACKET FOR OPTICAL ASSEMBLY

(71) Applicant: HUBER+SUHNER Cube Optics AG, Mainz (DE)

(72) Inventors: Ingo Smaglinski, Mainz (DE); Thomas Petigk, Rüsselsheim (DE)

(73) Assignee: HUBER+SUHNER Cube Optics AG, Mainz (DE)

( * ) Notice: Subject to any disclaimer, the term of this patent is extended or adjusted under 35 U.S.C. 154(b) by 230 days.

(21) Appl. No.: 16/361,524

(22) Filed: Mar. 22, 2019

(65) Prior Publication Data

US 2019/0293903 A1    Sep. 26, 2019

(30) Foreign Application Priority Data

Mar. 23, 2018   (DE) ..................... 10 2018 107 034.9

(51) Int. Cl.
*G02B 7/182* (2021.01)
*G02B 6/42* (2006.01)
*G02B 7/00* (2021.01)

(52) U.S. Cl.
CPC .......... *G02B 7/182* (2013.01); *G02B 6/4226* (2013.01); *G02B 7/008* (2013.01)

(58) Field of Classification Search
CPC ..... G02B 7/182; G02B 6/4226; G02B 6/4426
USPC ....................................... 359/872
See application file for complete search history.

(56) References Cited

U.S. PATENT DOCUMENTS

| 5,801,891 | A | 9/1998 | Lloyd | |
|---|---|---|---|---|
| 6,870,632 | B2 * | 3/2005 | Petasch | G02B 7/023 |
| | | | | 356/614 |
| 7,760,452 | B2 * | 7/2010 | Mizuno | G02B 7/1822 |
| | | | | 359/823 |
| 8,267,611 | B2 | 9/2012 | Paatzsch et al. | |

(Continued)

FOREIGN PATENT DOCUMENTS

| DE | 102 28 054 A1 | 1/2004 |
|---|---|---|
| DE | 10 2005 049 731 A1 | 4/2007 |
| DE | 10 2009 014 972 A1 | 10/2010 |

OTHER PUBLICATIONS

German Search Report dated Jul. 30, 2018, issued in corresponding German Patent Application No. 10 2018 107 034.9.

*Primary Examiner* — Ricky D Shafer
(74) *Attorney, Agent, or Firm* — Morgan, Lewis & Bockius LLP (57) ABSTRACT

Assembly with connecting element connecting a first and a second component, the connecting element has a base part connected to the first component, a first spring element and a second spring element. First and second spring elements are connected to the second component and each have a spring constant in two mutually perpendicular directions in space which is respectively at least twice as high as that in the third direction in space which is perpendicular to the first two directions in space, known as the elasticity direction. Elasticity directions of the two spring elements do not run parallel and define a first plane of elasticity. The base part comprises a floor element to which the first spring element is fastened and a first limb element to which the second spring element is fastened, wherein the first limb element comprises a fastening element for fastening the assembly to a third component.

17 Claims, 7 Drawing Sheets

(56) References Cited

U.S. PATENT DOCUMENTS

| | | | |
|---|---|---|---|
| 8,532,444 B2* | 9/2013 | Smaglinski | G02B 6/4215 |
| | | | 385/17 |
| 8,977,080 B2* | 3/2015 | Smaglinski | G02B 6/4215 |
| | | | 385/18 |
| 10,901,160 B2* | 1/2021 | Petigk | G02B 6/423 |
| 2005/0069376 A1 | 3/2005 | Blanding | |
| 2005/0078386 A1* | 4/2005 | Takabayashi | G02B 7/026 |
| | | | 359/819 |

* cited by examiner

ELASTIC MOUNTING BRACKET FOR OPTICAL ASSEMBLY

The present invention concerns an assembly, in particular an optical assembly, consisting of a first and a second component and a connecting element which connects the two components.

There are a large number of possible uses in which two or three components have to be aligned and fixed relative to each other at a specific separation. Particularly in optics, optical components frequently have to be aligned relative to each other with extremely high positional and angular precision and then fixed relative to each other in the aligned position in order to keep aberration defects, for example, to a minimum.

An example of an assembly of this type is disclosed in DE 10 2005 049 731 A1, for example. The assembly therein consists of a first and a second component and a connecting element connecting the components which comprises at least two spring elements. The connecting element is characterized in that each of the two spring elements has a spring constant in two mutually perpendicular directions in space which is respectively at least twice as high as that in the third direction in space which is perpendicular to the first two directions in space, what is known as the elasticity direction. The two spring elements in that case are configured in a manner such that the relevant elasticity directions do not run parallel to each other.

Figure 13:
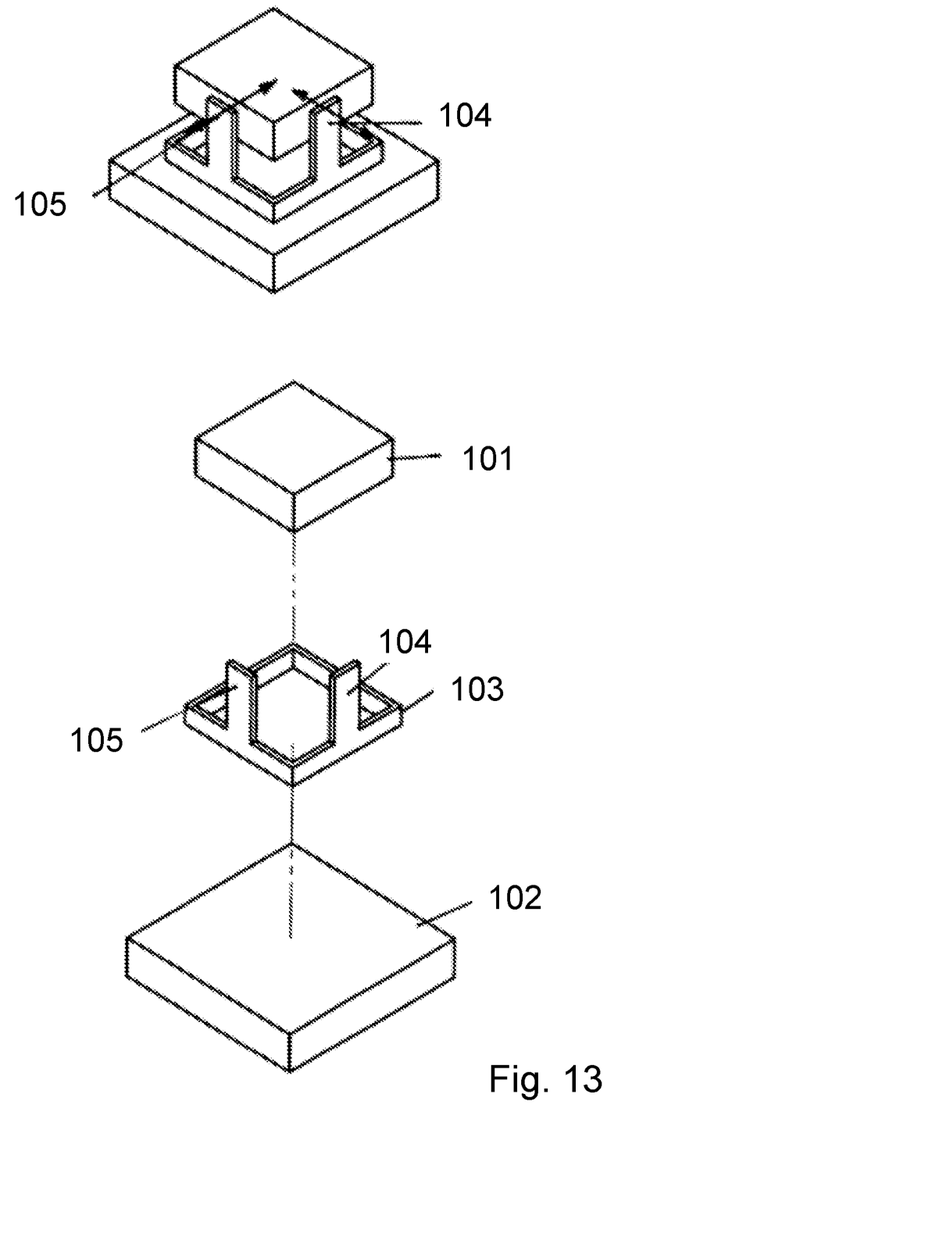

FIG. 13 reproduces an assembly which essentially corresponds to DE 10 2005 049 731 A1. In this regard, FIG. 13 shows an assembly both in a perspective view (top) and also in an exploded view (bottom).

The connecting element 103, which comprises spring elements 104 and 105, can be seen therein. The component 101 is fastened to the spring elements 104 and 105 and the connecting element 103 together with the component 101 is positioned or bonded to the component 102.

By means of the assembly shown, it is possible to mount the two components 101 and 102 elastically with respect to each other in a manner such that in the case of different thermal expansion coefficients of the two components, the positional deviations between the two components can be controlled.

Starting from the contact point of the two spring elements 104 and 105 with the component 101, the respective elasticity directions of the two spring elements 104 and 105 converge at a common fixed point which lies within the component 101. In the event of a thermally induced change in volume of the component 101, because of the connecting element 103, the component 101 will expand from this fixed point in the plane set by the elasticity directions. In other words, the position of the fixed point relative to the component 102 will remain constant during any thermally induced volume change.

In practice, optical assemblies frequently have more than two components which have to be aligned with respect to each other. Thus, a plurality of the known connecting elements has to be used. This is complicated and requires a great deal of space.

More than two components which have to be aligned with respect to each other are employed, for example, in the production of optical multiplexers or demultiplexers.

The method known as multiplexing is a method for the shared transmission of a plurality of independent signals (primary signals) via a single transmitting medium. In a multiplexer, the various independent signals are combined into a single multiplex signal. Next, the multiplex signal is transmitted along a signal conductor and, on the receiving end, is broken down again into the various independent signals in a demultiplexer.

In the method known as frequency-division multiplexing, a plurality of adjacent but mutually separate frequency bands are provided which are each assigned a specific carrier frequency and bandwidth. The carrier frequencies of a frequency band are modulated with the primary signals, whereupon a primary signal is assigned to a carrier frequency. The modulated signals resulting therefrom can then be transmitted jointly and independently as a broad bandwidth multiplex signal. On the receiving end, the multiplexer signal can then be split into the signals for the various frequency bands using filters. The modulated signals contained in the frequency bands are then demodulated, whereupon the originally transmitted signal is obtained.

When transmitting signals using optical cables, an optical frequency-division multiplexing method is used as a rule; this is also described as a wavelength-division multiplexing method. In this method, optical signals with different carrier frequencies are used as carrier signals for the transmission. In this regard, each carrier frequency used has a unique transmission channel on which the actual signals to be transmitted (primary signals or even data signals) can be modulated (amplitude modulation). The data signals modulated in this manner are then bundled using appropriate optical coupling elements and transmitted simultaneously, but independently of each other. At the receiver of this optical multiplexing connection, the individual optical transmission channels are then separated out again in a demultiplexer with the aid of appropriate wavelength-selective elements, for example passive optical filters. The optical signals can subsequently be transformed into electrical signals using appropriate receiving elements (for example detectors).

A further optical multiplexing method is polarisation-division multiplexing. This too can be used for the bundled transmission of optical signals. For reasons of simplicity in describing the present invention, however, reference will almost exclusively be made to the wavelength-division multiplexing method. The present invention is not limited to this, however, and can be applied in analogous manner to other multiplexing methods such as, for example, the polarisation-division multiplexing method.

Optical multiplexers and demultiplexers have been known for a long time. In general, a multiplexer can also be used as a demultiplexer by reversing the beam path, and vice versa. In order to obtain a multiplexer from a demultiplexer, it merely suffices to use transmission elements such as, for example, lasers and diodes which produce the appropriate optical signals to be transmitted instead of receiving elements (detectors) which transform the received transmitted optical signals into electrical signals.

"Receiving or transmission elements" also include coupling elements, such as, for example, coupling grids, or prisms which can couple a signal directly into a waveguide or can decouple from a waveguide.

The description below explicitly relates to a demultiplexer. However, it should be understood that the features described may also advantageously be applied to multiplexers simply by reversing the direction of the beam.

Demultiplexers generally have an input connection or a signal output for a waveguide in order to couple in an optical signal, which comprises signal components of various wavelengths, at least one wavelength-selective element as well as at least two focussing elements, wherein the wavelength-selective element and the focussing elements are disposed in a manner such that at least a portion of an optical signal coupled via an input connection initially encounters the wavelength-selective element and then a focussing element and a further portion initially encounters the wavelength-selective element and then another focussing element.

The term "a wavelength-selective element" should be understood to mean any element which, when set in the beam path, affects one or more wavelength channels or polarisation channels, whereupon at least one wavelength or polarisation channel is affected in a different manner or at a different strength than a further wavelength or polarisation channel. The term "affects" should, for example, be understood to mean reflection, absorption, amplification, attenuation, interruption or polarisation. For the purposes of simplification, the won "wavelength-selective" as used in the context of the present invention includes the term "polarisation-selective". A polarisation filter in this context is also a wavelength-selective element.

The term "focussing element" should be understood to mean any element which is capable of concentrating incident parallel beams of light essentially onto one point, what is known as the focus or focal point. Examples of focussing elements are optical lenses or concave mirrors. When the direction of the beam is reversed, focussing elements act as collimators. The term "collimator" should be understood to mean any element which is capable of transforming an incident bundle of divergent light beams into a bundle of parallel beams of light.

In the simplest case, the demultiplexer comprises only one wavelength-selective element and two focussing elements. An input signal which consists of two separate frequency components (frequency channels) is then directed onto the wavelength-selective element which reflects one frequency component and transmits the other. The focussing elements in this case are disposed in a manner such that one receives the transmitted beam and the other receives the reflected beam and focuses it into the respective focal point. If a suitable irradiation detector, for example a photodiode, is disposed at the appropriate focal points, then the amplitude, i.e. the radiation intensity of the frequency signal, can be detected electrically.

In general, a demultiplexer comprises a plurality of wavelength-selective elements onto which the signal is directed one after the other along the beam path, whereupon each wavelength-selective element separates one wavelength channel from the rest of the signal. The arrangement of a plurality of wavelength-selective elements in a successive sequence in the beam path is also known as a filter cascade.

However, the production of demultiplexers is very complicated. This is due, inter alia, to the alignment of the optical elements that is necessary. The combined signal on an appropriate transmission medium, for example an optical fibre, must be deflected onto appropriate detector elements with the aid of a precisely aligned arrangement of filters and mirrors in order to carry out an effective splitting of the signal into its individual channel components. In this regard, in addition, the functionality of the demultiplexer often has to be ensured within a wide range of temperatures from approximately −40° C. to 85° C., so that external environmental influences or operationally induced temperature changes do not lead to restrictions in functionality. The range of temperatures in which an unrestricted functionality is guaranteed is described as the thermal tolerance range of the demultiplexer.

Because of the ever-growing spread and ever-more intensive use of fibre optic cables, the level of requirements with which demultiplexer or multiplexers have to comply as regards their tolerance to thermal variations is also rising. The thermal tolerance range of a demultiplexer thus plays an important role and may constitute a limiting factor for employing the demultiplexer.

Furthermore, the spread of optical fibre technology also increases the requirements for simplicity in demultiplexers and multiplexers. As an example, more and more frequently, detector plates are being produced independently of the remaining components of a demultiplexer, whereupon it has turned out to be desirable to produce detector plates (third component) in one manner and an adapted module (assembly of the first and second components), which consist of the totality of the remaining components of a demultiplexer in a different manner; together they produce a complete demultiplexer. In this regard, its stability, i.e. resistance to external forces assaulting the demultiplexer module, should be at least as good as that in a demultiplexer which is not modular in construction.

The known demultiplexer systems in fact allow for neither a stable and compact modular assembly, nor for simple connection of a detector plate to the totality of the remaining components of a demultiplexer.

Starting from the described prior art, it is thus an objective of the present invention to provide an assembly, in particular an optical assembly, of a first and a second component which enables connection to a third component and which is also compact in construction.

In accordance with the invention, this objective is achieved by means of an assembly with the features of claim 1.

The assembly in accordance with the invention consists of a first and a second component and a connecting element connecting the two components. The connecting element in this regard comprises a base part connected to the first component, a first spring element and a second spring element, wherein the first and the second spring elements are connected to the second component. The two spring elements each have a spring constant in two mutually perpendicular directions in space which is respectively at least twice as high as that in the third direction in space which is perpendicular to the first two directions in space, what is known as the elasticity direction. The elasticity directions of the two spring elements do not run parallel and define a first plane of elasticity. In accordance with the invention, the base part comprises a floor element and a first limb element, wherein the first spring element is fastened to the floor element and the second spring element is fastened to the first limb element. The first limb element also comprises a fastening element which is provided for fastening the assembly to a third component.

A "fastening element" is that element which enables stable fastening of a third component. The fastening element may in particular also be constructed so as to be integral with the limb element. As an example, the edge of a limb element may constitute a fastening element if it enables stable fastening of a third component.

The configuration in accordance with the invention of the base part with the floor element and limb element means that, in a particularly compact manner, a first and a second component which are mounted opposite one another via spring elements can be fastened together onto a third component.

In a preferred embodiment, the floor element and the limb element are each essentially flat in configuration. In this regard, the surface of the floor element and the surface of the at least one limb element enclose an angle which is between 45° and 135°. Preferably, the angle is between 80° and 100°, and most preferably, the angle is 90°.

By means of a base part of this type essentially configured at an angle, the first and the second component can be disposed at a specific distance with respect to the third component in a particularly simple manner. In addition, in this manner, the construction of the assembly is even more compact and consequently more space-saving. Particularly with optical components, the desire for space-saving solutions is strong so that optical systems can be made smaller and thus usually more efficient.

In a further embodiment, the base part comprises a second limb element which is fastened to the floor element. Preferably, the second limb element in turn has a third spring element which has an elasticity direction which essentially coincides with the elasticity direction of the second spring element. Particularly preferably, the elasticity direction of the third spring element coincides exactly with the elasticity direction of the second spring element. The first and the second limb elements may be formed as mirror images of each other in this context.

A second limb element provides the connecting element with a greater measure of stability. Because the second limb element also comprises a fastening element for fastening the assembly to a third component, the second limb element allows for a stronger and more stable connection of the assembly to the third component. Furthermore, because of the second limb element, the opportunity arises for introducing and using a third spring element. In turn, a third spring element provides for a stronger and more stable connection of the first and second components.

The stability of the connecting element is particularly important, particularly when used in connection with optical components. As a rule, the connecting element plays a major role in aligning the optical components connected by the connecting element. If the connections via the connecting element are not sufficiently stable as a result, then misalignments could occur more often. Lack of stability of the connections may, for example, be caused by external influences such as thermal variations or vibrations. Because of a higher stability of the connecting element and of the corresponding connections of the components, therefore, the probability that the optical components could become misaligned due to external environmental influences is reduced.

In a particularly preferred embodiment, the free end of the first or the second limb element comprises an abutment surface which is provided for positioning on a corresponding abutment surface of the third component. An abutment surface of this type may, for example, be configured as a part of a surface of a step-shaped section of wall.

The abutment surface may in particular also be configured as a fastening element. If the normal to the surface of the surface of the third component to which the assembly is fastened is defined as the z axis, then the abutment surface is preferably a z abutment. This means that the normal to the surface of the abutment surface is also in the z direction. The advantage of such an embodiment is that the fastening element is particularly simple in configuration and thus is easy to produce and use.

In a further embodiment, the floor element and the limb elements form boundaries of a space in which the first component and preferably also the second component are disposed. In other words, the connecting element undertakes the function of a housing which surrounds the space in which the first and second components are located. The surround in this regard may also be only partial.

In this manner, advantageously, the connecting element undertakes the function of a housing for the first and the second components, whereupon the components are protected, for example, from dust or from inadvertent contact by the user. The "user" is anyone who uses the assembly, or produces it or maintains it or could come into contact with the assembly in any other manner.

In a further embodiment, a first limb element is provided having a first fastening element and a second limb element is provided having a second fastening element. In this regard, the first and the second limb elements or the first and the second fastening elements are configured as fastening spring elements. This means that the limb elements or fastening elements are simultaneously also spring elements. The first as well as the second limb elements or fastening elements consequently have a spring constant in two mutually perpendicular directions in space which is respectively at least twice as high than in the third direction in space which is perpendicular to the first two directions in space, what is known as the elasticity direction. A limb element or fastening element may, for example, be configured as a tab, whereupon it has the nature of a spring element. In addition, the two elasticity directions of the fastening spring elements do not run parallel to each other and define a second plane of elasticity.

By means of the configuration of the limb elements or the fastening elements as spring elements, not only is a connection provided between the assembly and a third component, but also this means that this connection is anisotropically elastic in configuration. Thus, the third component may be mounted with respect to the assembly in a manner such that during a thermal expansion of the third component, this occurs from a specific fixed point (pivot point) which is defined by the position of the two fastening spring elements. The fixed point itself or the position of the third component which is disposed at the site of the fixed point, will not change its position relative to the assembly even if the volume of the third component changes. The volume change of the third component will thus occur from the fixed point outwards. The advantage of this embodiment is particularly in that three components with different thermal expansion coefficients can be mounted against each other by means of a single connecting element and, in respect of thermal variations, will thereby guarantee a large measure of angular and positional precision. This capability may also be described as the capability of coupled, doubly anisotropic elastic mounting.

The particular advantage of this embodiment is that the fixed point may be selected in a manner such that its position may coincide with the position of a highly sensitive optical component. The position of such a highly sensitive optical component will consequently also not change if the volume of the third component (or the assembly) relative to the assembly (or to the third component) changes. As an example, the position of optical detectors, for which it is extremely important that a light beam should impinge upon the detector almost at the centre of the detector, may be set as the location of the fixed point.

In a particularly preferred embodiment, the first and the second planes of elasticity are not parallel to each other in configuration, wherein first and second planes of elasticity are preferably at right angles to each other.

An arrangement of the planes of elasticity of this type is associated with a particularly compact construction of the connecting element. As a consequence, the first and second components are disposed anisotropically elastically against each other in the first plane of elasticity and the assembly resulting therefrom formed by the first and second component is in turn mounted against a third component in a plane of elasticity which is perpendicular thereto.

In a preferred embodiment, the first spring element is configured so as to be integral with the floor element and the second spring element is configured so as to be integral with the first limb element. In this regard, the term "integral" should be understood to mean a construction in a single piece and from the same material. Spring elements which, for example, are connected to the floor element or the limb element by bonding, soldering or welding are not integrally formed with the respective element in the context of the present invention.

It has been shown that an integral configuration of this type of the spring elements can be produced in a particularly simple and cheap manner. Furthermore, by dispensing with glued areas or joints, a source of misalignment is avoided. It is difficult to produce glued areas and joints of a plurality of connecting elements of a consistent quality with the same goods when producing a plurality of connecting elements. This problem disappears with an integral configuration.

In a further preferred embodiment, the connecting element is a bent part, wherein preferably, the first limb element and the floor element each comprise a U-shaped recess so that the sections remaining between the arms of the U of each recess form the first and the second spring elements.

The bent part may be produced by die cutting, etching or laser cutting, for example.

The special U-shaped embodiment is attractive on the one hand by its simplicity of form and production. On the other hand, the connecting element provides a good protection from external environmental influences because of the integral design of the spring elements by means of minimal recesses, because the limb elements or fastening spring elements only have comparatively small recesses, so that dust can barely penetrate into the space partially surrounded by the connecting element.

By being configured as a bent part, in addition, the work for the operator assembling the assembly and carrying out the alignment of the components is simplified. The operator only has to bend the various parts of the connecting element towards each other in order to bring the connecting element into the suitable shape for correct alignment.

In a particularly preferred embodiment, the fastening element is either configured as a recess so that it can accommodate a protrusion on the third component, or is configured as a protrusion so that it can be inserted into a recess located on the third component.

Such a configuration of the fastening elements in particular allows for simple bonded indenting between the assembly and the third component. Alternatively, the protrusions and recesses may be configured in a manner such that an interlocking push-in connection is produced between the fastening element and the third component.

In the case of bonded indenting, the protrusions or recesses are additionally sheathed or coated with adhesive shortly before they are connected to a corresponding element. As a rule, the cross sectional area of a recess is thus larger than the corresponding cross sectional area of the associated protrusion.

By means of bonded indenting of this type, in particular with optical components, an initial coarse alignment of the components is enabled and the stability of the component connections is increased.

In a further particularly preferred embodiment, the connecting element is formed in one piece. In this context, the term "in one piece"—in analogy with the understanding of the to "integral"—should be understood to mean a construction in one piece from one and the same material. Connecting elements which, for example, are put together using sub-components by bonding, soldering or welding, are not "in one piece" within the meaning of the present invention.

A one-piece configuration is advantageous in particular for the user or operator who uses the connecting element to connect the first, second and third components. He only has to use a single connecting element to which all components are fastened, thereby considerably facilitating the alignment of the components with respect to each other, in particular when using optical components. In addition, connecting elements configured in one piece have fewer edges, burrs or grooves into which dust particles can settle which in turn could have an influence on the function of the components to be connected—in particular optical components.

In a further embodiment, a fourth component is provided, wherein the connecting element comprises two further spring elements, which both are respectively connected to the fourth component. The two further spring elements each have a spring constant in two mutually perpendicular directions in space which is respectively at least twice as high as that in the third direction in space which is perpendicular to the first two directions in space, what is known as the elasticity direction. The two further spring elements in this regard respectively have non-parallel elasticity directions, which define a third plane of elasticity which preferably is disposed parallel to the first plane of elasticity.

With a connecting element of this type, the first component may in particular be connected to a second and a fourth component which have an identical or very similar functionality and have to be disposed exclusively on different sides of the first component. Thus, in multiplexers or demultiplexers, for example, two focussing members may be positioned on opposite sides of a carrier plate. In this case the second and fourth components are focussing members, wherein each of the two focussing members comprises at least one focussing element and one of the focussing members comprises a collimating element. In this case, the first component is configured as a carrier plate with at least one wavelength-selective element and in the case of a demultiplexer, the third element is a detector plate which comprises at least two receiving elements (detectors) or, in the case of a multiplexer, a transmission plate which comprises at least two transmission elements (for example diodes or lasers).

Furthermore, the present invention encompasses a module consisting of the assembly described above and a third component, wherein the third component is fastened to the fastening element of the at least one first limb element. In a particularly preferred embodiment, this module is configured as a multiplexer or demultiplexer. This should be understood to include an optical multiplexer or demultiplexer.

In this manner, the assembly described above is advantageously used for connection to a third component. In particular, the production of a demultiplexer may therefore on the one hand be divided into the production of a detector plate and on the other hand the production of a demultiplexer module, wherein the demultiplexer module comprises all of the components of the demultiplexer apart from the detector plate and can be configured as the assembly in accordance with the invention. The demultiplexer module can be connected to the detector plate via the fastening element of the assembly in accordance with the invention. This may be carried out within a production line for the demultiplexer module or the detector plate, but this is not essential. In addition, for example, it may be carried out in a separate step of the production, for example by a manufacturer which is not involved in the production of the two components (demultiplexer module and detector plate).

In a particularly preferred embodiment, the first component is a carrier plate which comprises at least one wavelength-selective element and at least one reflecting element. The second component is a focussing member which comprises a collimating element and at least two focussing elements, and the third component is a detector plate which comprises at least two receiving elements (detectors) or a transmitting plate which comprises at least two transmitting elements (for example diodes or lasers).

In an alternative embodiment, the first component is a carrier plate which comprises at least one wavelength-selective element. The second and fourth components are (as already described above) focussing members which respectively comprise at least one focussing element and at least one thereof comprises a collimating element. Like the embodiment described above, the third component s a detector plate or a transmitting plate.

Further advantages, features and possible applications of the present invention will now be illustrated with the aid of the description below of a preferred embodiment and the associated Figures. In the Figures.

Figure 1:
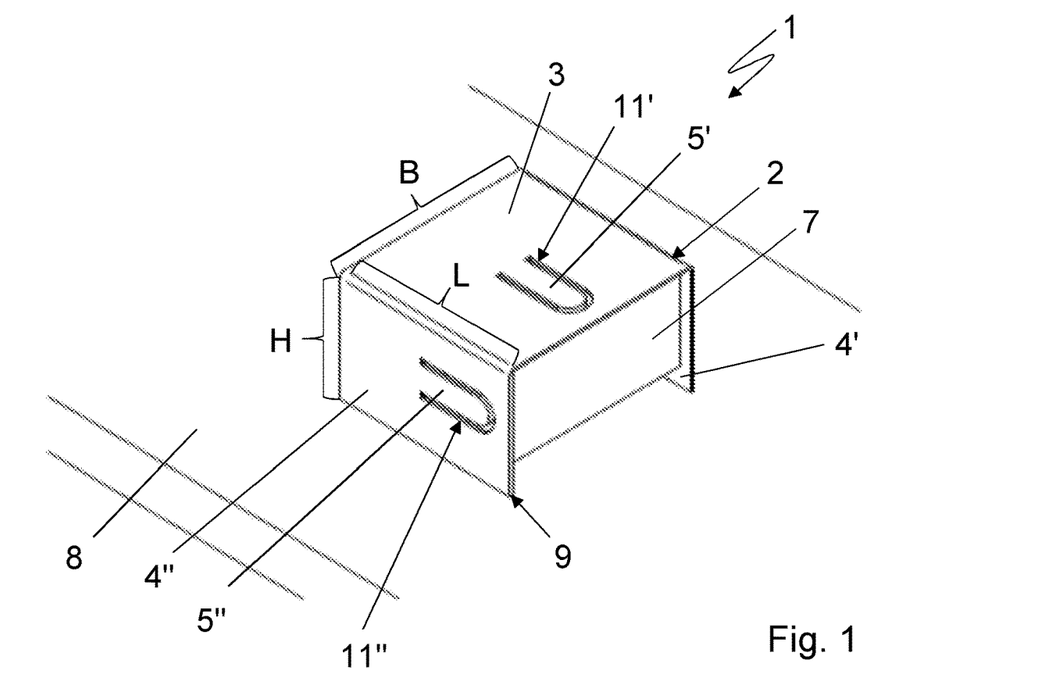
FIG. 1: shows a perspective view of a first embodiment of the assembly in accordance with the invention connected to a third component.

FIG. 1 shows a first embodiment of an assembly 10 in accordance with the invention connected to a third component 8. Overall, then, FIG. 1 shows an embodiment of a module 1 in accordance with the invention. A U-shaped connecting element 2 can be seen which connects a first component 6 to a second component 7 via a first spring element 5' and a second spring element 5". In the view shown, the first component 6 is concealed by the connecting element 2 and thus cannot be seen. The connecting element itself is connected to a third component 8 via the edges 9 which act as fastening elements. Thus, the connecting element 2 is connected to the third component 8 via the entire edge 9, wherein the edge 9 is usually bonded to the third component 8. In the embodiment shown, the edges 9 constitute fastening elements.

The connecting element 2 shown in FIG. 1 is configured as a base part, wherein the spring elements 5' and 5" are integrally formed by the respective U-shaped recesses 11' and 11" with the base part 2. The base part 2 is thus divided into a floor element 3, a first limb element 4" and a second limb element 4'. The two limb elements 4' and 4" in this embodiment are configured as fastening spring elements. The spring elements 5' and 5" are flat in configuration, exactly as was the case with the limb elements 4' and 4", so that the elasticity directions of the two spring elements 5' and 5" run respectively perpendicular to the large surfaces of the spring elements. The elasticity direction for the first spring element 5' is thus disposed perpendicularly to the elasticity direction of the second spring element 5", so that the elasticity directions intersect at one point. This intersection sets the fixed point of the second component 7 from which, in the event of a thermal expansion, the second component 7 expands relative to the first component 6. In the embodiment shown, the fixed point is consequently centrally disposed in the second component, because both the first spring element 5' and also the second spring element 5" are respectively fastened at the centre of the second component.

The connecting element 2 shown in FIG. 1 has a length L, a width B and a height H. As a rule, the length and width are in an approximate ratio of 1:1 with respect to each other. In the example shown here, the width B of the connecting element 2 is approximately 10% larger than the length L of the connecting element 2. The height H of the connecting element 2 in the case shown here is approximately three-fifths of the length L. The length of a spring element 5' or 5" is approximately two-fifths of the length L and the height of the spring elements 5' and 5" is approximately one tenth of the length L.

Figure 2:
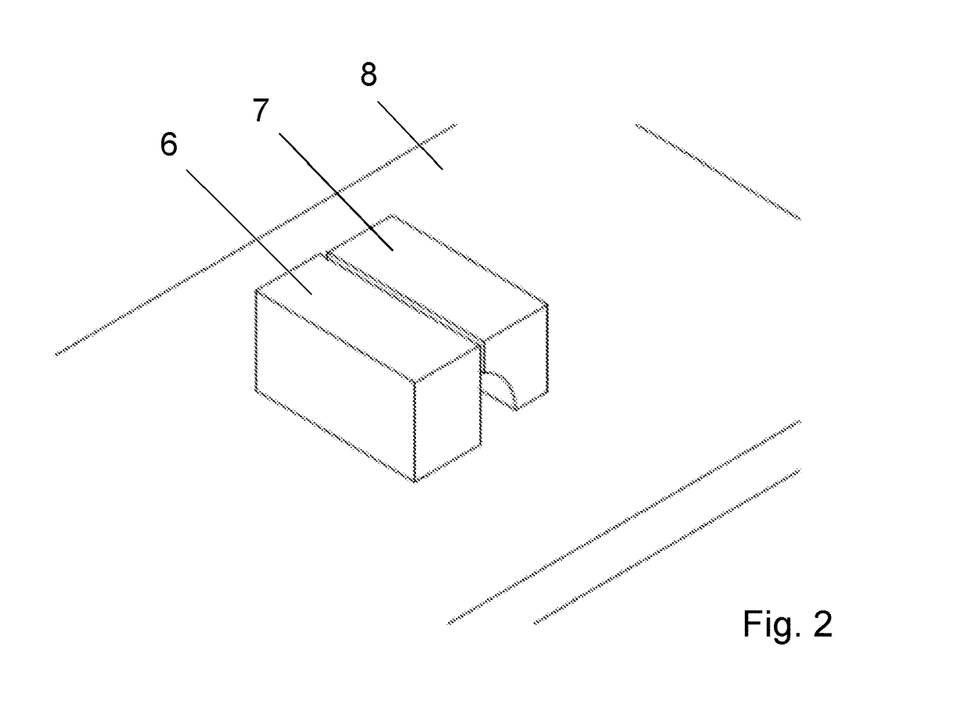
FIG. 2: shows a further perspective view of the assembly shown in FIG. 1, wherein only the first, second and third components are shown.
Figure 3:
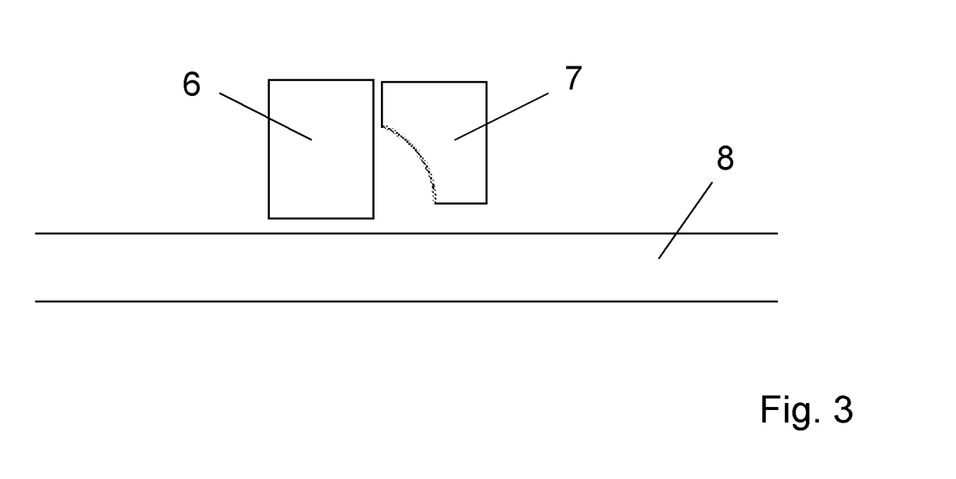
FIG. 3: shows a side view of the assembly shown in FIG. 2, FIG. 4: shows a side view of the assembly shown in FIG. 1, FIG. 5: shows a further perspective view of the assembly in accordance with the invention shown in FIG. 1 with glued areas on the edges.

FIG. 2 shows the module in accordance with the invention from FIG. 1 in a further perspective view and without the connecting element 2. As a consequence, only the first component 6, the second component 7 and the third component 8 can be seen. FIG. 3 shows a corresponding side view of the components shown in FIG. 2. The positioning of the components with respect to each other is clear with the aid of FIG. 2 and FIG. 3. All of the components are disposed separately from each other, wherein in the embodiment shown here, the second component 7 is separated from the third component 8 by a distance which is approximately double that of the distance between the first component 6 and the third component 8. The distance between the first component 6 and the second component 7 in the embodiment shown in FIGS. 2 and 3 is approximately two thirds of the distance between the first component 6 and the third component 8.

Figure 4:
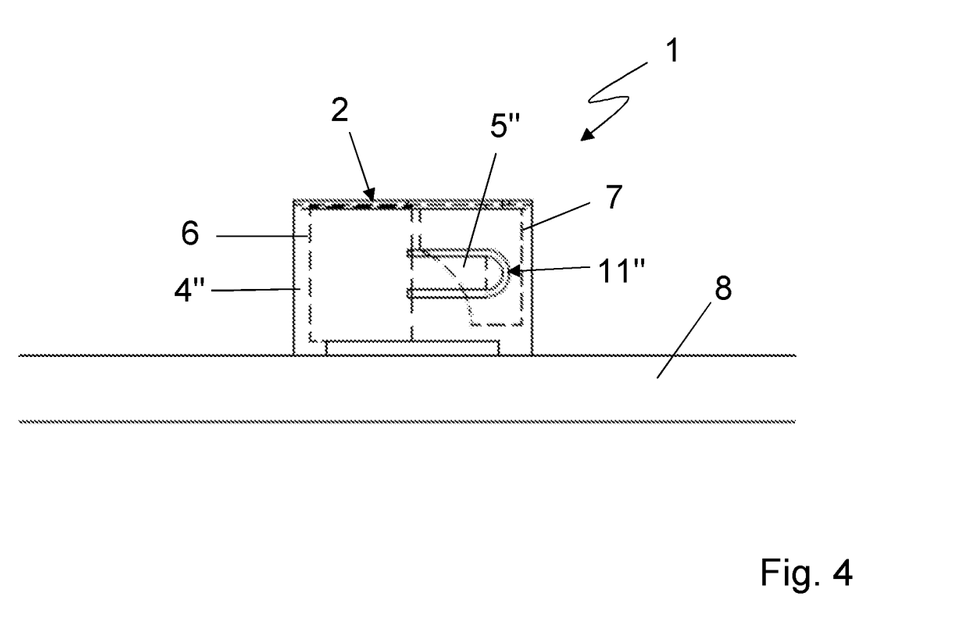

FIG. 4 is a side view of the module 1 in accordance with the invention shown in FIG. 1, wherein the first component 6 and the second component 7, which from the observer's viewpoint is behind the limb element 4" of the connecting element 2, is indicated by dashed lines. With the aid of this illustration, it is particularly clear that the second spring element 5" connects the first component 6 to the second component 7 in a manner such that the second component 7 is disposed at a distance from the first component 6 and from the third component 8. In this manner, the second component 7 is exclusively fastened to the connecting element via the spring elements 5' and 5" or optionally also via further spring elements.

The elastic direction of the spring element 5 shown here runs perpendicularly to the observed plane. This is determined by the flat configuration of the spring element with a small expansion of the spring element in that direction which is perpendicular to the observed plane (thickness of the spring element as seen in FIG. 1) and by the elongate U-shaped recess.

Figure 5:
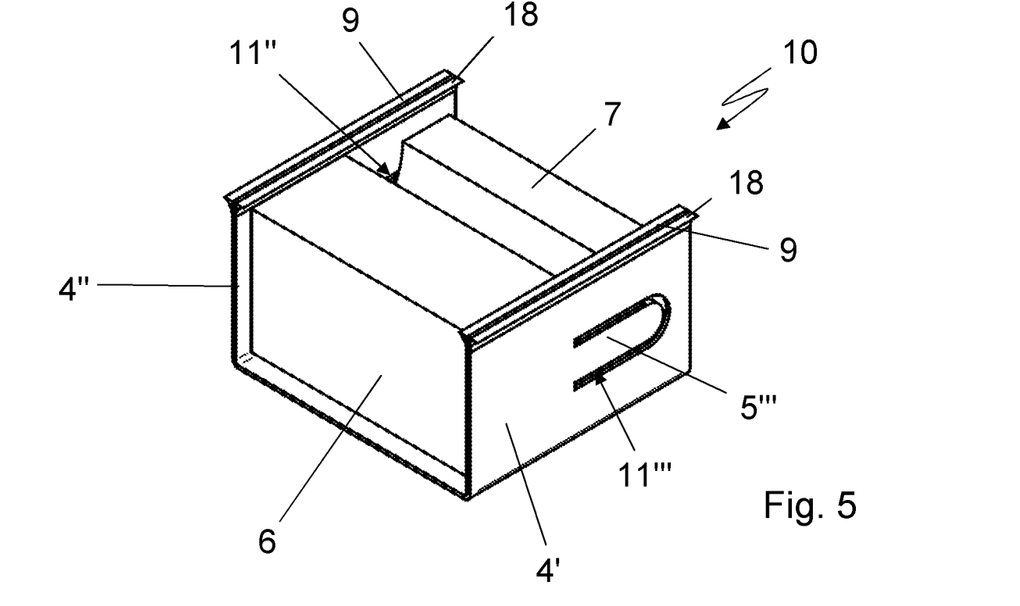

FIG. 5 shows the assembly 10 in accordance with the invention shown in FIG. 1. Here, it is a perspective view in which the observer is looking at the side of the assembly 10 which faces a third component 8 after connection to this third component 8. However, the third component 8 is not shown in FIG. 5. The embodiment shown here differs from the earlier embodiments shown in FIGS. 1 to 5 in that adhesive 18 is applied to the edges 9. The assembly 10 is bonded to a third component at the edges 9 by means of the edges coated with adhesive. In this manner, a stable connection is produced with the third component.

On the basis of the perspective view shown in FIG. 5, the limb element 4' in this view can easily be seen. In the embodiment shown here, a third spring element 5''' can be seen which is formed integrally with the limb element 4' by means of a U-shaped slot 11'. In this manner, the second spring element 5" and the third spring element 5''' are disposed opposite each other so that the two elasticity directions of the two spring elements lie on a common straight line.

Figure 6:
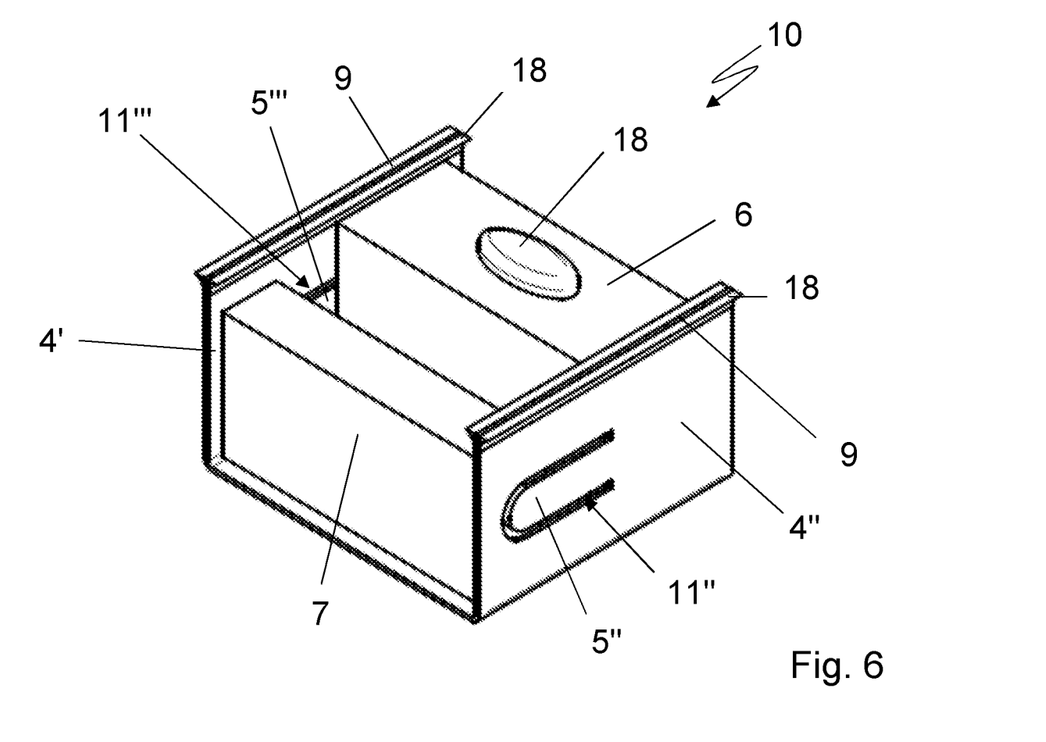
FIG. 6: shows an alternative perspective view of the assembly in accordance with the invention shown in FIG. 5 including an adhesion point on the first component.

FIG. 6 shows an assembly 10 in accordance with the invention which only differs from the assembly 10 in accordance with the invention of FIG. 5 in that an additional glued area 18 is disposed at the first component 6 which can produce a direct connection between the first component 6 and the third component 8. An additional glued area 18 of this type is in particular used when an extremely stable connection between the assembly 10 and a third component 8 is required and a spaced-apart connection between the first component 6 and the third component 8 can be dispensed with. By studying FIGS. 6 and 7, it can be seen that the respective perspectives of the views are different, wherein in both figures, the side of the assembly 10 facing the third component 8 is shown.

Figure 7:
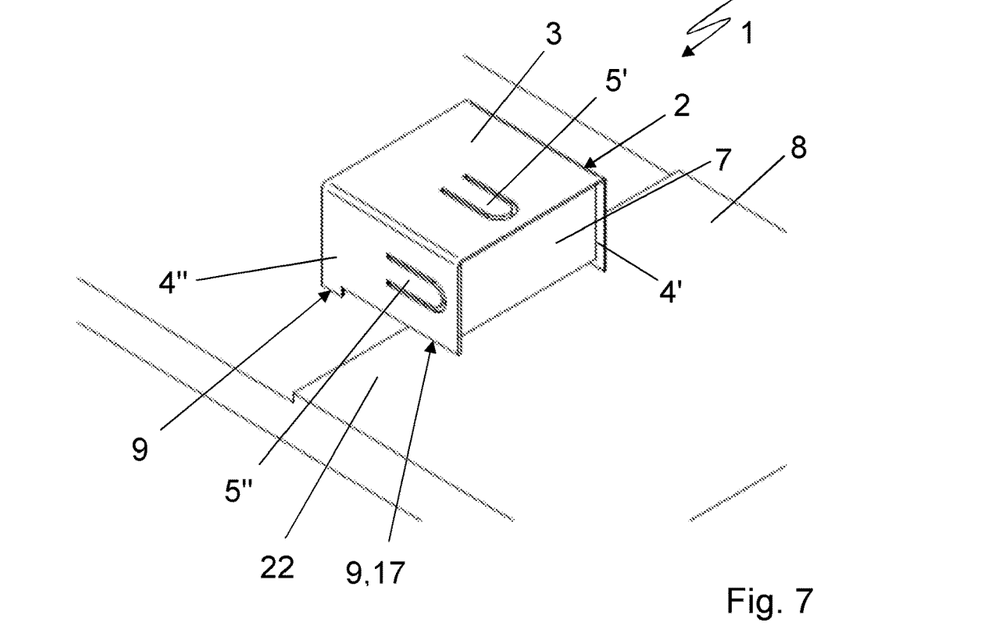
FIG. 7: shows a perspective view of a second embodiment of the assembly in accordance with the invention, connected to a third component.

FIG. 7 shows a second embodiment of the module 10 in accordance with the invention, which in the view shown here is connected to a third component 8. The third component in this case has an abutment 22. Corresponding abutment surfaces 17 are formed on the connecting element 2 which are positioned on the abutment 22 of the third component 8. The connecting element 2 thus sits at two different heights above the edges 9 of the limb elements 4' and 4" at the third component.

Figure 8:
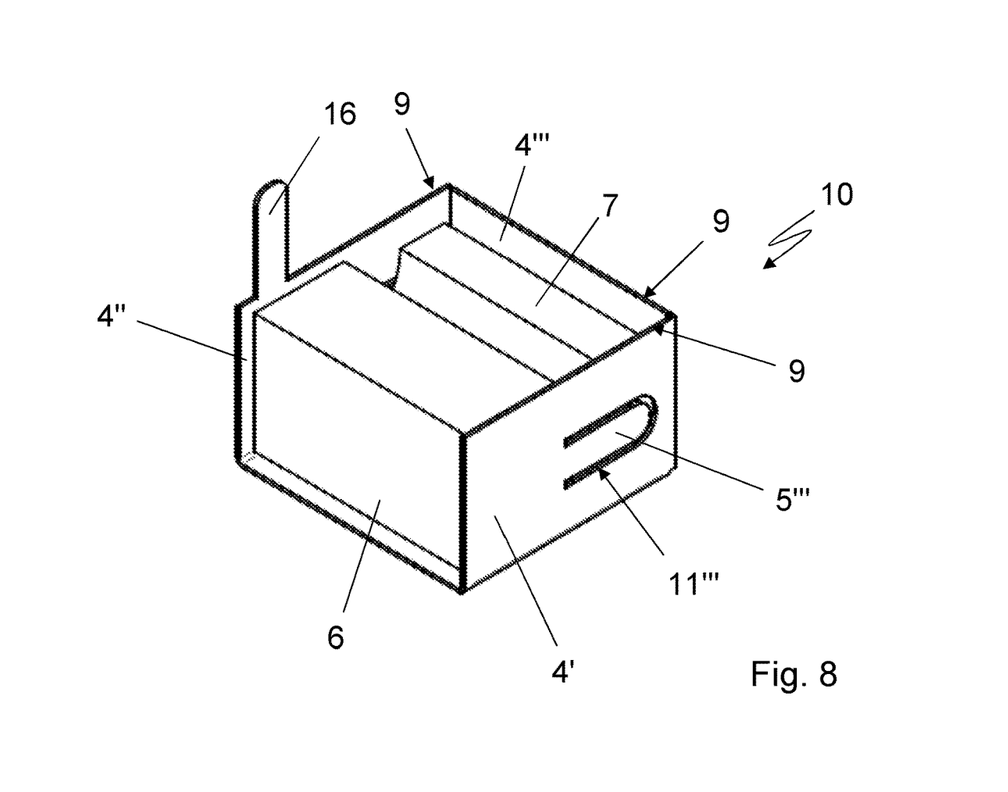
FIG. 8: shows a perspective view of a third embodiment of the assembly in accordance with the invention.

FIG. 8 shows a third embodiment of the assembly 10 in accordance with the invention. In this case, the connecting element 2 has a total of three limb elements 4', 4" and 4'''. In this view, the third limb element 4''' is located on the side of the assembly 10 facing away from the observer. In addition to the edges 9 of the limb elements 4', 4" and 4''' in particular the fastening element 16 serves to connect the assembly 10 to a third component 8. This fastening element 16 is integrally formed with the connecting element 3 as a protrusion/push-in element.

Figure 9:
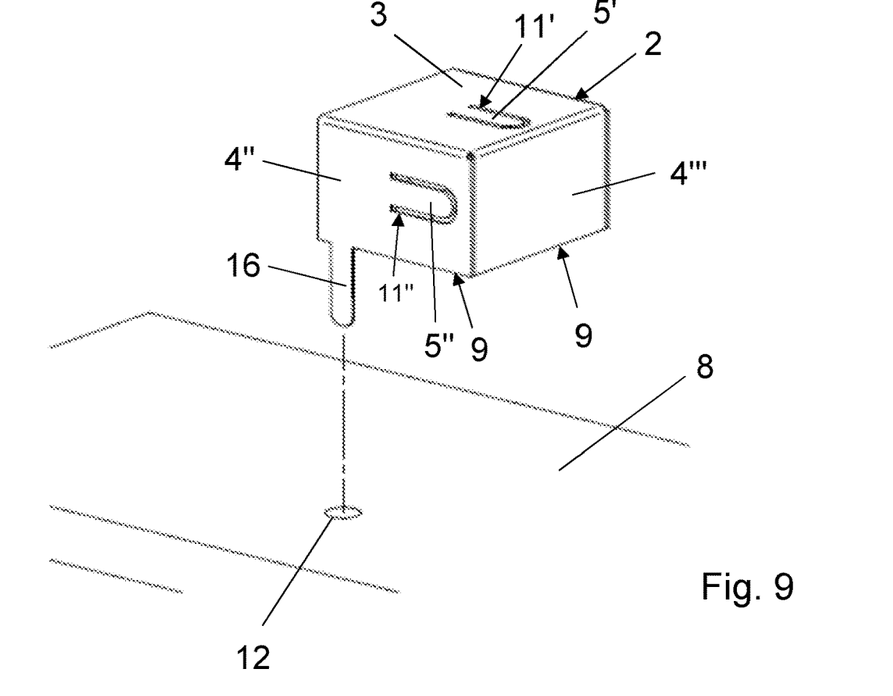
FIG. 9: shows an exploded view of the assembly in accordance with the invention shown in FIG. 8 and a third component.
Figure 10:
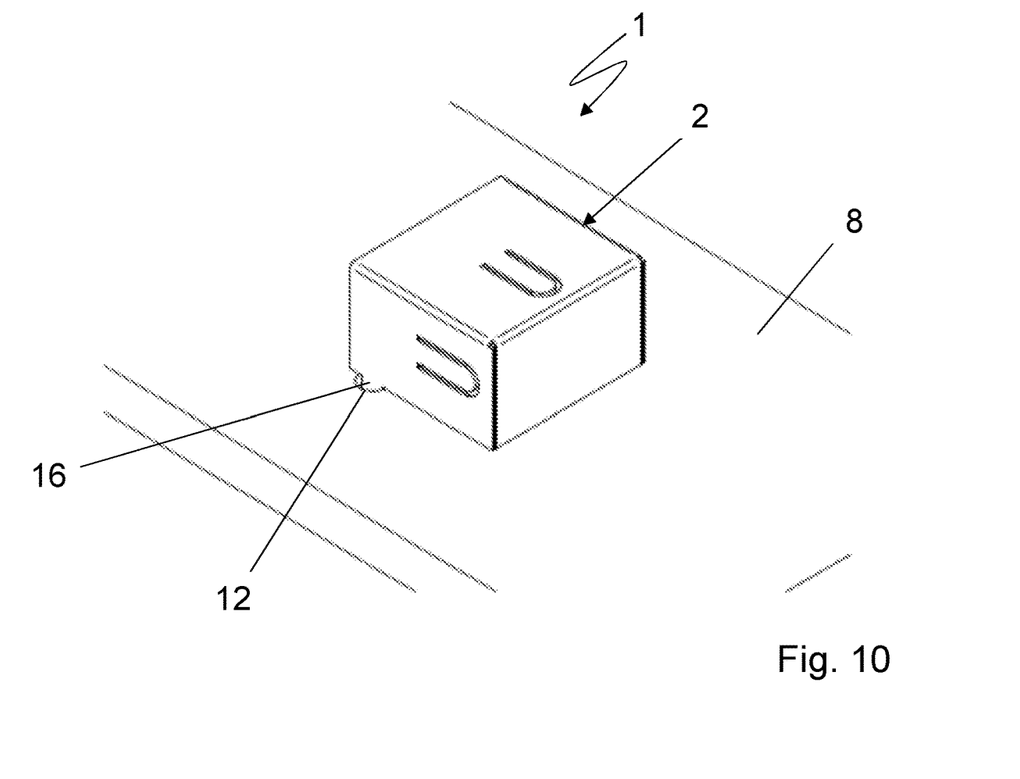
FIG. 10: shows a perspective view of a module in accordance with the invention consisting of the assembly in accordance with the invention, as shown in FIG. 8 and a third component.

FIG. 9 shows the assembly shown in FIG. 8 in an exploded view together with a third component 8. The third component 8 in this case has a circular recess 12 which, for example, may be formed as a drilled hole and is provided in order to accommodate the fastening element 16. The cross-sectional area of the recess 12 (in a plane which is defined by the length L and width B, see FIG. 1) is in this case larger than the corresponding cross-sectional area of the fastening element 16. By applying adhesive to the fastening element 16 and/or into the recess 12, accordingly, bonded indenting of the assembly 10 with the third component 8 can be obtained. Because, in addition, this is not an interlocking push-in connection, the positioning of the assembly for the purposes of alignment may also be slightly modified after connection. The assembled module 1 consisting of the assembly 10—as can be seen in FIGS. 8 and 9—and the third component shown in FIG. 9—is shown in FIG. 10.

Figure 11:
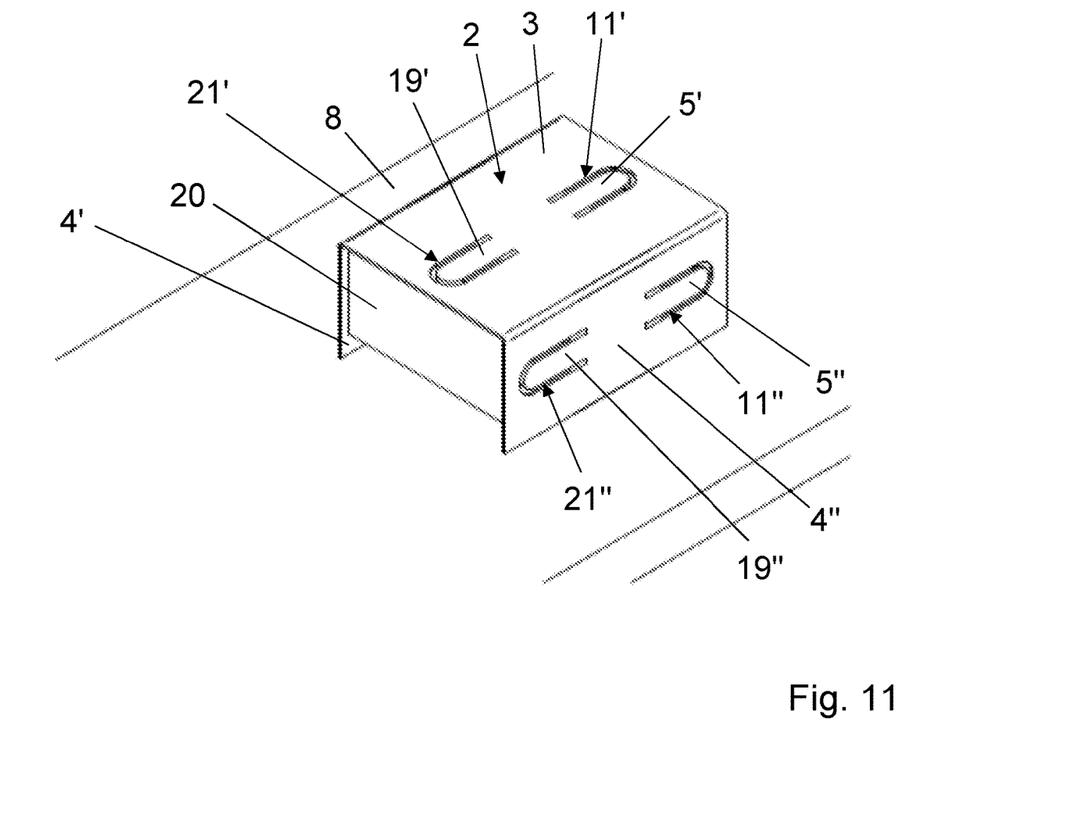
FIG. 11: shows a perspective view of a fourth embodiment of the assembly in accordance with the invention, connected to a third component.
Figure 12:
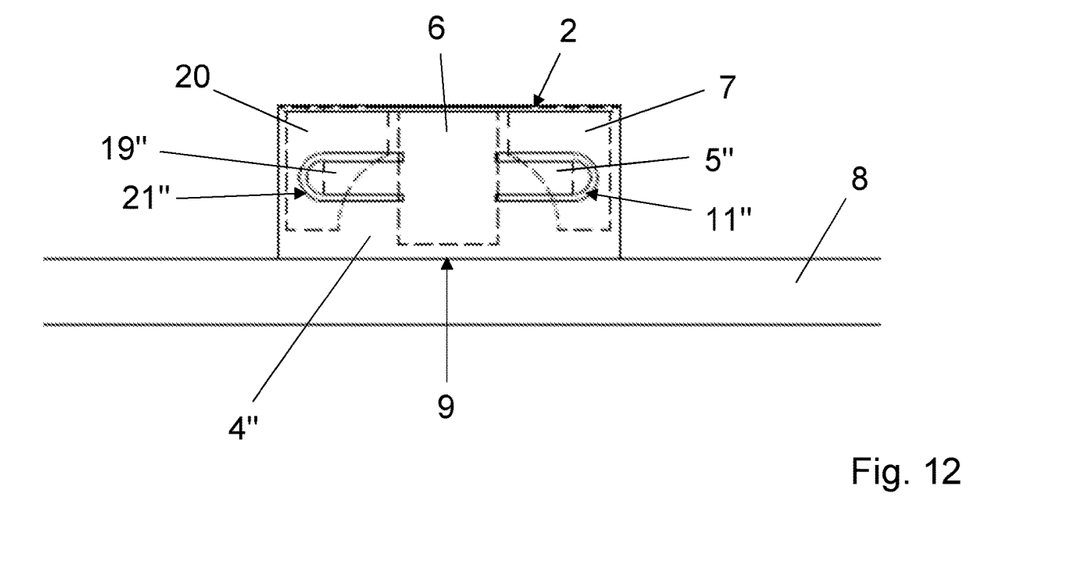
FIG. 12: shows a side view of the assembly in accordance with the invention shown in FIG. 11, FIG. 13: shows a prior art assembly.

FIG. 11 shows a perspective view of a fourth embodiment of the assembly in accordance with the invention and FIG. 12 shows a corresponding side view of this embodiment, wherein in the side view, the components which in fact cannot be seen which lie on the side facing away from the observer of the limb element 4" shown, are indicated by dashed lines. In the embodiment shown here, a fourth component 20 is connected to the first component via further spring elements 19' and 19". In this regard, the fourth component 20 and the second component 7 are symmetrically disposed on two opposite sides of the first component 6. The further spring elements 19' and 19" are mirror images of each other, corresponding to the spring elements 5' and 5".

As a consequence, the further spring elements 19' and 19" are also integrally configured with the connecting element 2 by further U-shaped recesses 21' and 21".

| List of reference numerals | |
|---|---|
| 1 | module |
| 2 | connecting element (base part) |
| 3 | floor element |
| 4' | second limb element |
| 4" | first limb element |
| 4''' | third limb element |
| 5' | first spring element |
| 5" | second spring element |
| 5''' | third spring element |
| 6 | first component |
| 7 | second component |
| 8 | third component |
| 9 | edge (fastening element) |
| 10 | assembly |
| 11', 11", 11''' | U-shaped recess |
| 12 | recess |
| 13 | (additional) limb element |
| 14', 14" | fastening element |
| 15 | adhesive |
| 16 | protrusion (fastening element) |
| 17 | abutment surface |
| 18 | adhesive/glued area |
| 19', 19" | further spring element |
| 20 | fourth component |
| 21', 21" | (further) U-shaped recess |
| 22 | abutment (third component) |
| 101 | component |
| 102 | component |
| 103 | connecting element |
| 104 | spring element |
| 105 | spring element |
| L | length of connecting element |
| B | width of connecting element |
| H | height of connecting element |

What is claimed is:

1. An assembly consisting of a first and a second component and a connecting element connecting the two components, wherein the connecting element comprises a base part connected to the first component, a first spring element and a second spring element, wherein the first and the second spring elements are connected to the second component and each have a spring constant in two mutually perpendicular directions in space which is respectively at least twice as high as that in a third direction in space which is perpendicular to the two directions in space, defined as an elasticity direction, wherein the two spring elements have elasticity directions which do not run parallel to each other and which define a first plane of elasticity, wherein the base part comprises a floor element to which the first spring element is fastened, and a first limb element to which the second spring element is fastened, and wherein the first limb element comprises a fastening element for fastening the assembly to a third component.

2. The assembly as claimed in claim 1, wherein the floor element and the limb element are each essentially flat in configuration, and wherein the surface of the floor element and the surface of the at least one limb element enclose an angle which is between 45° and 135°.

3. The assembly as claimed in claim 2, wherein the angle is between 80° and 100°.

4. The assembly as claimed in claim 1, wherein the base part comprises a second limb element which is fastened to the floor element, wherein the second limb element comprises a fastening element for fastening the assembly to the third component, and wherein a third spring element is provided on the second limb element and has an elasticity direction which essentially coincides with the elasticity direction of the second spring element.

5. The assembly as claimed in claim 4, wherein the free end of the first or the second limb element comprises at least one abutment surface which is provided for positioning on a corresponding abutment surface of the third component.

6. The assembly as claimed in claim 4, wherein the floor element and the two limb elements form boundaries of a space in which the first component and the second component are disposed.

7. The assembly as claimed in claim 1, wherein a second limb element with a second fastening element is provided and the first and the second limb elements or the first and the second fastening elements are configured as fastening spring elements which respectively have a spring constant in two mutually perpendicular directions in space which is respectively at least twice as high as that in the third direction in space which is perpendicular to the two directions in space, defined as an elasticity direction, and wherein the two elasticity directions of the two fastening spring elements do not run parallel to each other and define a second plane of elasticity.

8. The assembly as claimed in claim 7, wherein the first and the second planes of elasticity are not disposed parallel to each other, and wherein the first and the second planes of elasticity are disposed at right angles to each other.

9. The assembly as claimed in claim 7, wherein the first spring element is configured so as to be integral with the floor element and the second spring element is configured so as to be integral with the first limb element.

10. The assembly as claimed in claim 9, wherein the connecting element is a bent part, wherein the first limb element and the floor element each comprise a U-shaped recess so that the sections remaining between the arms of the U of each recess form the first and the second spring elements.

11. The assembly as claimed in claim 1, wherein the fastening element is either configured as a recess so that it can accommodate a protrusion located on the third component, or is configured as a protrusion so that it can be inserted into a recess located on the third component.

12. The assembly as claimed in claim 1, wherein the connecting element is formed in one piece.

13. The assembly as claimed in claim 1, wherein a fourth component is provided and the connecting element comprises two further spring elements, wherein the two further spring elements are respectively connected to the fourth component and each have a spring constant in two mutually perpendicular directions in space which is respectively at least twice as high as that in the third direction in space which is perpendicular to the two directions in space, defined as an elasticity direction, and wherein the two further spring elements respectively have non-parallel elasticity directions which define a third plane of elasticity which is disposed parallel to the first plane of elasticity.

14. A module consisting of an assembly as claimed in claim 1 and a third component, wherein the third component is fastened to the fastening element of the at least one first limb element.

15. The module as claimed in claim 14, wherein the module is a multiplexer or a demultiplexer.

16. The module as claimed in claim 15, wherein the first component is a carrier plate which comprises at least one wavelength-selective element and at least one reflecting element, the second component is a focussing member which comprises a collimating element and at least two focussing elements, and the third component is a detector plate which comprises at least two receiving elements or a transmitting plate which comprises at least two transmitting elements.

17. A module including an assembly as claimed in claim 1, further comprising a third component, wherein the third component is fastened to the fastening element of the first limb element, wherein the module is a multiplexer or a demultiplexer, and wherein the first component is a carrier plate which comprises at least one wavelength-selective element, the second component is a focussing member which comprises a collimating element and at least one focussing element, the fourth component is a focussing member which comprises at least one focussing element, and the third component is a detector plate which comprises at least two receiving elements or a transmitting plate which comprises at least two transmitting elements.

* * * * *